US010891229B2

(12) United States Patent
Yoo et al.

(10) Patent No.: US 10,891,229 B2
(45) Date of Patent: Jan. 12, 2021

(54) MULTI-LEVEL CACHING METHOD AND MULTI-LEVEL CACHING SYSTEM FOR ENHANCING GRAPH PROCESSING PERFORMANCE

(71) Applicant: Chungbuk National University Industry-Academic Cooperation Foundation, Cheongju-si (KR)

(72) Inventors: Seunghun Yoo, Gumi-si (KR); Dojin Choi, Sangju-si (KR); Jongtae Lim, Cheongju-si (KR); Kyoungsoo Bok, Sejong-si (KR); Jaesoo Yoo, Cheongju-si (KR)

(73) Assignee: CHUNGBUK NATIONAL UNIVERSITY INDUSTRY-ACADEMIC COOPERATION FOUNDATION, Cheongju-si (KR)

( * ) Notice: Subject to any disclaimer, the term of this patent is extended or adjusted under 35 U.S.C. 154(b) by 0 days.

(21) Appl. No.: 16/221,286

(22) Filed: Dec. 14, 2018

(65) Prior Publication Data

US 2019/0179752 A1    Jun. 13, 2019

(51) Int. Cl.
*G06F 12/00* (2006.01)
*G06F 12/0811* (2016.01)
(Continued)

(52) U.S. Cl.
CPC ...... *G06F 12/0811* (2013.01); *G06F 12/0891* (2013.01); *G06F 12/128* (2013.01);
(Continued)

(58) Field of Classification Search
CPC .............. G06F 12/0811; G06F 12/128; G06F 12/0891; G06F 16/9017; G06F 16/9024; G06F 16/9027
See application file for complete search history.

(56) References Cited

U.S. PATENT DOCUMENTS

| 9,824,028 B2 * | 11/2017 | Shimizu | G06F 12/121 |
| 2002/0053004 A1 * | 5/2002 | Pong | G06F 12/0817 |
| | | | 711/119 |

FOREIGN PATENT DOCUMENTS

| KR | 20110096302 | 8/2011 |
| KR | 20130042821 | 4/2013 |
| KR | 20170073739 | 6/2017 |

OTHER PUBLICATIONS

Aksu, Hidayet et al., "Graph Aware Caching Policy for Distributed Graph Stores"; 2015 IEEE International Conference on Cloud Engineering, Mar. 9-13, 2015.
(Continued)

*Primary Examiner* — Kalpit Parikh
(74) *Attorney, Agent, or Firm* — Holzer Patel Drennan

(57) ABSTRACT

A multi-level caching method and a multi-level caching system for enhancing a graph processing performance are provided. The multi-level caching method includes searching for graph data associated with a query from a first cache memory in which data output in response to a previous query request is stored, when a query request for the query is received, re-searching for the graph data from a second cache memory in which neighboring data with a history of an access to each of data stored in the first cache memory is stored, when the graph data is not found in the first cache memory, and outputting first neighboring data found by the re-searching as the graph data when a response to the query request is output.

10 Claims, 10 Drawing Sheets

(51) Int. Cl.
    *G06F 12/128*     (2016.01)
    *G06F 16/901*     (2019.01)
    *G06F 12/0891*     (2016.01)

(52) U.S. Cl.
    CPC ...... *G06F 16/9017* (2019.01); *G06F 16/9024* (2019.01); *G06F 16/9027* (2019.01)

(56) References Cited

OTHER PUBLICATIONS

Puzak, Thomas R., "Analysis of Cache Replacement-Algorithms," Dissertation submitted to the Graduate School of the University of Massachusetts, Feb. 1985.

Ran, Panfeng, et al., "NYNN: An In-memory Distributed Storage System for Massive Graph Analysis," 7$^{th}$ International Conference on Advanced Computational Intelligence, Mount Wuyi, Fujian, China; Mar. 27-29, 2015.

Yoo, Seunghun et al., "Caching Scheme Considering Access Patterns in Graph Environments," Fourth Industrial Revolution Contents; vol. 15, No. 1.

Yoo, Seung-Hun et al., "In-memory Multilevel Caching Scheme Considering Pattern and Connectivity in a Large Graph," ICCC2017 International Conference on Convergence Content, vol. 15, No. 2.

\* cited by examiner

Query 1

Query 2

Query 3          Query 4

Query 5

410

| Query ID | Vertex |
|---|---|
| 1 | f, c, a, m, p |
| 2 | f, c, a, b, m |
| 3 | f, b |
| 4 | c, b, p |
| 5 | f, c, a, b |
| ⋮ | ⋮ |

| Vertex$_{no}$ | TTL value | Vertex$_{no}$ | TTL value |
|---|---|---|---|
| A | 3 | H | 2.2 |
| B | 3 | I | 2.2 |
| C | 3 | J | 2.2 |
| D | 2.5 | K | 0 |
| E | 2.5 | L | 0 |
| F | 2.2 | M | 0 |
| G | 2.2 | | |

MULTI-LEVEL CACHING METHOD AND MULTI-LEVEL CACHING SYSTEM FOR ENHANCING GRAPH PROCESSING PERFORMANCE

CROSS-REFERENCE TO RELATED APPLICATION(S)

This application claims the benefit of Korean Patent Application No. 10-2017-0180554, filed on Dec. 27, 2017, in the Korean Intellectual Property Office, the disclosure of which is incorporated herein by reference.

BACKGROUND

1. Field of the Invention

One or more example embodiments relate to an in-memory caching technology of pre-loading data in a disk memory into a cache memory, and more particularly, to a multi-level caching method and a multi-level caching system for enhancing a graph query processing performance by caching frequently accessed graph data and neighboring data of the frequently accessed graph data separately in different cache memories based on an access frequency and a graph usage pattern in a query history.

2. Description of the Related Art

Recently, due to development of social media and mobile devices, graph data is being utilized to represent a relationship and an interaction between objects in various fields, such as a social network, a semantic web, and a bio information system.

Generally, graph data is represented as "G=(V, E)" in which V denotes a set of vertices indicating information or features, and E denotes a set of edges indicating information about an interaction or a relationship between vertices.

Also, studies are being conducted on caching techniques to reduce input/output costs in processing of large capacity graph data. Among the studies, more research is being conducted on an in-memory caching technique of allowing data in a disk memory to reside in a cache memory to effectively enhance a system performance.

In-memory caching is a scheme of allowing data used in a disk memory to reside in a cache memory that is easily accessed and of accessing the data in the cache memory to reduce a cost of an access to the disk memory. Various in-memory caching schemes based on a connectivity of graph data have been proposed.

When graph data is processed based on a cache memory using an existing in-memory caching scheme, neighboring vertices used together with a subgraph are not be considered. Thus, the existing in-memory caching scheme has a limit to process a graph query within a limited subgraph.

Also, in the existing in-memory caching scheme, when data of a subgraph is cached in a cache memory, all neighboring vertices with a connectivity to the data are cached, which results in an overload of a memory and a large amount of input/output.

Thus, there is a desire for a caching method of a multi-level memory hierarchy that may separately cache data of a used subgraph and neighboring data with an access history from the data based on a history of use of the subgraph and a connectivity of a graph that is a feature of a graph topology.

SUMMARY

An aspect is to predict and cache data that is highly likely to be used in a subsequent graph query request based on an access frequency to each subgraph, instead of merely loading data of each subgraph used in a query history into a cache memory.

Another aspect is to efficiently predict data that is highly likely to be used in a subsequent graph query request, by searching for data of each subgraph used in a query history and neighboring data used together with the data and by caching the data and the neighboring data.

Still another aspect is to efficiently search multi-level cache memories (for example, "2-layer" cache memories) in a graph query request and to enhance a graph processing performance, by separately loading data of a subgraph used in a query history and neighboring data used together with the data in different cache memories.

Yet another aspect is to increase a lifespan of data so that data may reside in a first cache memory for a relatively long period of time, by extracting query patterns overlapping in each subgraph used in a previous query request, by assigning a weight to data corresponding to the query patterns and by setting the data to have a time-to-live (TTL) value greater than those of other data.

According to an aspect, there is provided a multi-level caching method including searching for graph data associated with a query from a first cache memory in which data output in response to a previous query request is stored, when a query request for the query is received, re-searching for the graph data from a second cache memory in which neighboring data with a history of an access to each of data stored in the first cache memory is stored, when the graph data is not found in the first cache memory, and outputting first neighboring data found by the re-searching as the graph data when a response to the query request is output.

According to another aspect, there is provided a multi-level caching system including a searcher configured to search for graph data associated with a query from a first cache memory in which data output in response to a previous query request is stored, when a query request is received, and configured to re-search for the graph data from a second cache memory in which neighboring data with a history of an access to each of data stored in the first cache memory is stored, when the graph data is not found in the first cache memory, and an outputter configured to output first neighboring data found by the re-searching as the graph data when a response to the query request is output.

Additional aspects of example embodiments will be set forth in part in the description which follows and, in part, will be apparent from the description, or may be learned by practice of the disclosure.

Effect

According to example embodiments, it is possible to predict and cache data that is highly likely to be used in a subsequent graph query request based on an access frequency to each subgraph, instead of merely loading data of each subgraph used in a query history into a cache memory.

According to example embodiments, it is possible to efficiently predict data that is highly likely to be used in a subsequent graph query request, by searching for data of each subgraph used in a query history and neighboring data used together with the data and by caching the data and the neighboring data.

According to example embodiments, it is possible to efficiently search multi-level cache memories (for example, "2-layer" cache memories) in a graph query request, possible to enhance a graph processing performance, by separately loading data of a subgraph used in a query history and neighboring data used together with the data in different cache memories, and possible to easily manage data that are highly likely to be used although not used with the data used in the query history.

According to example embodiments, it is possible to increase a lifespan of data so that data may reside in a first cache memory for a relatively long period of time, by extracting query patterns overlapping in each subgraph used in a previous query request, by assigning a weight to data corresponding to the query patterns and by setting the data to have a time-to-live (TTL) value greater than those of other data.

According to example embodiments, it is possible to prevent data stored in a cache memory from being frequently replaced and prevent data with a relatively low availability from being cached, by caching a subgraph with a relatively high accessibility based on an access frequency and a subgraph usage pattern.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 is a table illustrating a time-to-live (TTL) value set based on an extraction of a query pattern in a multi-level caching system according to an example embodiment;

DETAILED DESCRIPTION

Figure 1:
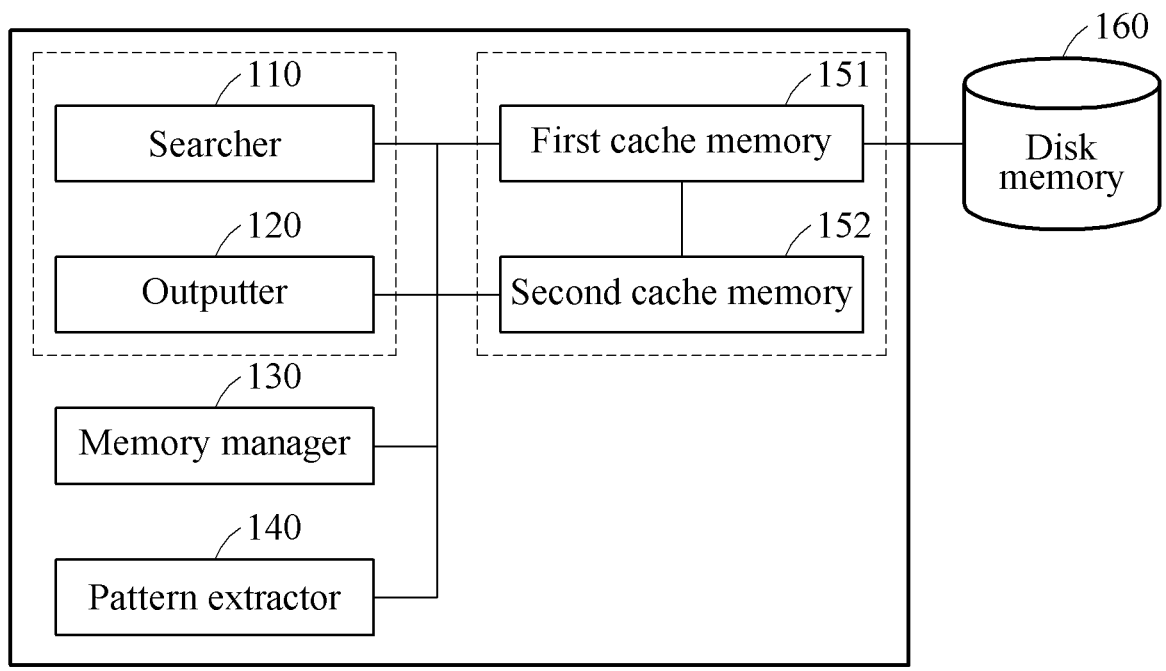
FIG. 1 is a block diagram illustrating a configuration of a multi-level caching system according to an example embodiment.

Hereinafter, example embodiments will be described in detail with reference to the accompanying drawings. The scope of the right, however, should not be construed as limited to the example embodiments set forth herein. Like reference numerals in the drawings refer to like elements throughout the present disclosure.

A multi-level caching system according to an example embodiment may cache data of a frequently used subgraph and neighboring data of the data separately in different cache memories based on a multi-level cache memory hierarchy (for example, "2-layer" cache memories).

For example, the multi-level caching system may assign a weight to data based on a pattern of a frequently used subgraph and may cache the data in a first cache memory (for example, a used data cache). Also, the multi-level caching system may cache, in a second cache memory (for example, a prefetched cache), neighboring data determined to be highly likely to be connected to and used together with recently used data although not used.

To this end, the multi-level caching system may extract a query pattern by utilizing subgraph usage history information, may assign a weight to data included in the extracted query pattern, and may load the data in the first cache memory.

Also, the multi-level caching system may identify a number of accesses used together with each vertex from an edge connecting vertices constituting a subgraph. Based on the number of accesses, the multi-level caching system may select a neighboring vertex with a high number of accesses among neighboring vertices (adjacent vertices) connected to vertices constituting a subgraph for which a query is currently requested, and may load the selected neighboring vertex in the second cache memory.

The multi-level caching system may manage data cached in the first cache memory based on a set time-to-live (TTL) value, using a first-in, first-out (FIFO) scheme, and may manage each of multi-level cache memories.

The TTL value may be set based on a pattern weight assigned to a frequently used query pattern in each subgraph used in a query history, and thus data corresponding to a query pattern may have a TTL value greater than those of the other data in the first cache memory, to increase a lifespan of data.

In an example, the multi-level caching system may maintain caching of data in the first cache memory within a set TTL value. In this example, when new data is added in a state in which the first cache memory is full, the multi-level caching system may delete data with a TTL value less than a TTL value set for the new data from the first cache memory and may replace the data by the new data, even though the TTL value of the data does not expire.

In another example, when new data is added in a state in which the second cache memory is full, the multi-level caching system may prepare a storage space by deleting data stored for a longest period of time in the second cache memory and may add the new data.

Thus, the multi-level caching system may manage each cache memory using different schemes, and may easily replace, by new data, data stored for a longest period of time in a cache memory and having a low availability when each cache memory is full.

Also, when graph data corresponding to a query request is found in the second cache memory (cache hit), the multi-level caching system may move data in the second cache memory to the first cache memory, may cache the data in the first cache memory, may set a TTL value and may manage caching of the data.

In addition, the multi-level caching system may search for neighboring data with a high number of accesses among neighboring data with an access history from the data, and may cache found data in the second cache memory.

FIG. 1 is a block diagram illustrating a configuration of a multi-level caching system according to an example embodiment.

Referring to FIG. 1, a multi-level caching system 100 for enhancing a graph processing performance according to an example embodiment may include a searcher 110, an outputter 120, and multi-level cache memories, for example, a first cache memory 151 and a second cache memory 152. Depending on example embodiments, the multi-level caching system 100 may further include a memory manager 130 and a pattern extractor 140.

The searcher 110 may search for graph data associated with a query from the first cache memory 151 in which data output in response to a previous query request is stored among the first cache memory 151 and a second cache memory 152, when a query request for the query is received.

When the graph data is not found in the first cache memory 151, the searcher 110 may re-search for the graph data from the second cache memory 152 in which neighboring data with a history of an access to each of data stored in the first cache memory 151 is stored.

Figure 8:
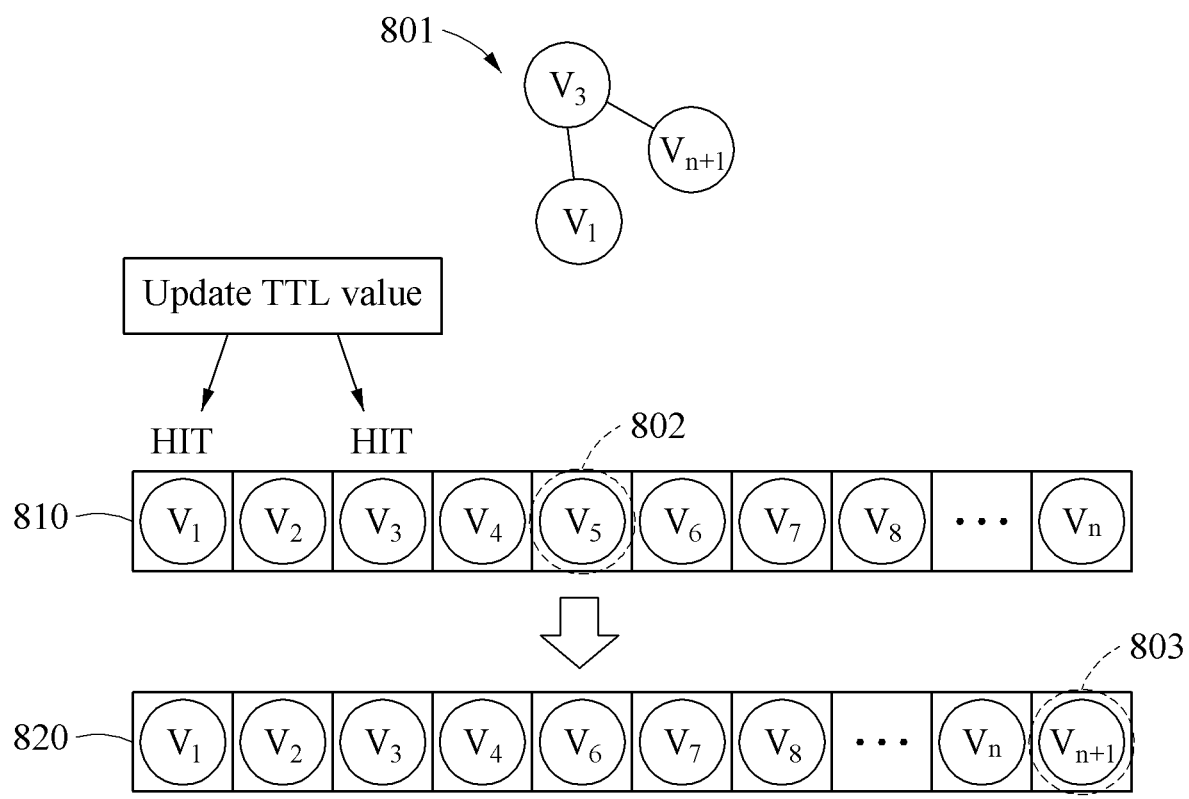
FIG. 8 is a diagram illustrating an example of managing a first cache memory in a multi-level caching system according to an example embodiment.

For example, referring to FIG. 8, when a query requesting a subgraph 801 is received, the searcher 110 may search for three vertices, for example, vertices $V_1$, $V_3$ and $V_{n+1}$ included in the subgraph 801 from a first cache memory 151, 810 in which vertices of a subgraph used in a previous query request are cached.

When two vertices, for example, the vertices $V_1$ and $V_3$ among the three vertices are hit in the first cache memory 810 and when the other vertex, for example, the vertex $V_{n+1}$ fails to be hit, the searcher 110 may re-search for a vertex $V_{n+1}$ 803 from the second cache memory 152 in which a neighboring vertex that is not used is cached.

The outputter 120 may output first neighboring data found in the second cache memory 152 by the re-searching as the graph data when a response to the query request is output.

For example, when a portion of a plurality of vertices is found (hit) in the first cache memory 151, the outputter 120 may combine a portion of the vertices found in the first cache memory 151 and remaining vertices found in the second cache memory 152 by the re-searching and may output the combined vertices as the graph data.

For example, referring to FIG. 8, the outputter 120 may output, as a query response, a subgraph obtained by combining the vertices $V_1$ and $V_3$ hit in the first cache memory 151 and the vertex $V_{n+1}$ 803 hit in the second cache memory 152.

In this example, the outputter 120 may perform updating to increase TTL values set for the vertices $V_1$ and $V_3$ hit in the first cache memory 151 so that the vertices may be maintained in the first cache memory 151, 810 for a longer period of time, using the memory manager 130 that will be described below.

For example, when hitting of the vertex $V_{n+1}$ in the second cache memory 820 fails, the searcher 110 may search for a vertex from a disk memory 160, and the outputter 120 may add a vertex $V_{n+1}$ hit in the disk memory 160 to the first cache memory 151, 810. The disk memory 160 may include, for example, an auxiliary memory such as a hard disk drive (HDD), a solid state disk (SSD), and the like.

As described above, searching in the first cache memory 151 in which data with a higher availability is cached may be performed first by changing a search order of graph data in the first cache memory 151 and the second cache memory 152 provided in a multi-level memory hierarchy. Thus, it is possible to quickly and accurately search for desired graph data.

Depending on example embodiments, the searcher 110 may simultaneously search for graph data from each of the first cache memory 151 and the second cache memory 152 in the multi-level memory hierarchy.

Depending on example embodiments, the multi-level caching system 100 may further include the memory manager 130.

The memory manager 130 may move first neighboring data found in the second cache memory 152 to the first cache memory 151 and may store the first neighboring data in the first cache memory 151.

For example, referring to FIG. 8, when the vertex $V_{n+1}$ 803 is hit in the second cache memory 152, the memory manager 130 may move the vertex $V_{n+1}$ 803 from the second cache memory 152 to the first cache memory 151, 810.

In this example, when the first cache memory 151 does not have an available storage space, the memory manager 130 may compare a TTL value set for data found in the second cache memory 152 to a minimum TTL value among TTL values set for each of data in the first cache memory 151. When the TTL value is greater than the minimum TTL value, the memory manager 130 may replace data with the minimum TTL value in the first cache memory 151 by data of the second cache memory 152, and may add and insert first neighboring data into the first cache memory 151.

When the TTL value is less than the minimum TTL value, the memory manager 130 may maintain a state in which the data is stored in the second cache memory 152, instead of moving data found in the second cache memory 152 to the first cache memory 151.

For example, referring to FIG. 8, when the first cache memory 810 capable of storing "n" vertices is full, the memory manager 130 may add a new vertex $V_{n+1}$ 803 to the first cache memory 810, instead of deleting a vertex $V_3$ 802 with a TTL value less than a TTL value assigned to the new vertex $V_{n+1}$ 803 from the first cache memory 810, and may update the first cache memory 810 to a first cache memory 820.

In this example, when a vertex with a TTL value less than that of the new vertex $V_{n+1}$ 803 is not in the first cache memory 810, the memory manager 130 may maintain the new vertex $V_{n+1}$ 803 in the second cache memory 152, instead of adding the new vertex $V_{n+1}$ 803 to the first cache memory 151, 810.

As described above, a vertex in the first cache memory 151 in which data of a subgraph used in a previous query is cached may be managed based on a TTL value, and data may be added by replacing a vertex with a minimum TTL value and a relatively low availability by a new vertex even though the first cache memory 151 does not have an available storage space.

A TTL value may refer to a value of time in which valid caching is maintained in the first cache memory 151. The memory manager 130 may set a TTL value to a vertex (data) added to the first cache memory 151 and may easily manage a limited space of the first cache memory 151.

Also, the memory manager 130 may select data with a history of an access to the first neighboring data stored in the first cache memory 151 from the disk memory 160, may add the selected data as new neighboring data to the second cache memory 152 and may store the data in the second cache memory 152.

In other words, the memory manager 130 may cache a vertex used in a graph query request in the first cache memory 151 while caching a neighboring vertex that is connected to the used vertex via an edge within a predetermined number of hops and that has a high availability (high number of accesses) although not used, in the second cache memory 152.

The data with the history of the access to the first neighboring data may refer to data used together with the first neighboring data, that is, data accessed after accessing the first neighboring data. In an edge between the data and the first neighboring data, a number of accesses to the data from the first neighboring data may be stored.

For example, in a subgraph, a number of times vertices A and B are used together, and a number of times the vertex A accesses the vertex B may be stored in an edge F connecting the vertices A and B. Thus, the memory manager 130 may select a neighboring vertex connected to the vertex A (first neighboring data) via an edge, as data used together with the first neighboring data.

Also, the memory manager 130 may select a neighboring vertex within top "k" (for example, two) neighboring vertices by a number of accesses stored in an edge with each neighboring vertex among neighboring vertices connected to the vertices A (first neighboring data) via an edge, as data used together with the first neighboring data.

For example, the memory manager 130 may select new neighboring data based on a number of accesses among data with a history of an access within a predetermined number of hops, from the first neighboring data.

Figure 7:
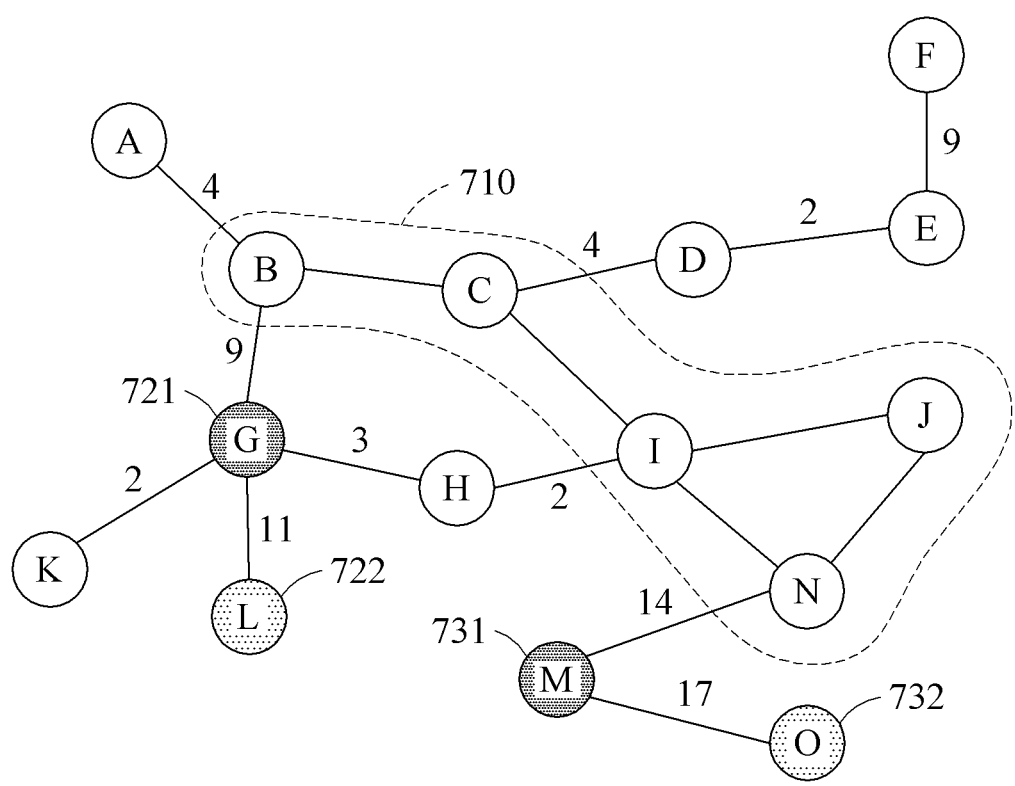
FIG. 7 is a diagram illustrating a process of caching a neighboring vertex in a multi-level caching system according to an example embodiment.

For example, referring to FIG. 7, while caching, in the first cache memory 151, vertices B, C, I, J and N used in a subgraph 710 output in response to a reception of a query request, the memory manager 130 may select vertices G 721, M 731, L 722 and O 732 that have a relatively high number of accesses among neighboring vertices connected via an edge within two hops to the vertices B, C, I, J and N used in the subgraph 710 although not used in the subgraph 710, and may cache the vertices G 721, M 731, L 722 and O 732 in the second cache memory 152.

In an example, when a number of hops is set to "2," the memory manager 130 may search for vertices A, D, G, H and M that are respectively adjacent to the vertices B, C, I, J and N used in the subgraph 710, may select the vertex G 721 that accessed the vertex B "9" times and vertex M 731 that accessed the vertex N "14" times, and may cache the vertices G 721 and M 731 in the second cache memory 152. In this example, the number of accesses by each of the vertices G 721 and M 731 may be within top two numbers of accesses. The memory manager 130 may not cache, in the second cache memory 152, the other neighboring vertices, that is, the vertices A, D and H with a relatively low number of accesses.

Also, the memory manager 130 may search for vertices K, L, H and O that are adjacent to the vertices G 721 and M 731, may select the vertex L 722 that accessed the vertex G 721 "11" times and the vertex O 732 that accessed the vertex M 731 "17" times from the vertices K, L, H and O, and may cache the vertices L 722 and M O 732 in the second cache memory 152. In this example, the number of accesses by each of the vertices L 722 and O 732 may be within top two numbers of accesses. Similarly, the memory manager 130 may not cache the other neighboring vertices, that is, the vertices K and H with a relatively low number of accesses in the second cache memory 152.

Thus, the memory manager 130 may select a neighboring vertex with a relatively high access history among neighboring vertices of a single hop, or may select a neighboring vertex with a relatively high access history by searching a chain structure up to neighboring vertices of a multi-hop. In an example of caching of multi-hop neighboring vertices, a process of selecting a neighboring vertex with a relatively high number of accesses from neighboring vertices selected in a previous hop may be repeated.

When the second cache memory 152 does not have an available storage space, the memory manager 130 may delete neighboring data from the second cache memory 152 in an order that the neighboring data is stored, and may add new neighboring data.

The memory manager 130 may manage the second cache memory 152 in a FIFO scheme. When the second cache memory 152 does not have an available storage space, vertices may be deleted in an order that the vertices are stored, and a new neighboring vertex may be added to the second cache memory 152.

Figure 9:
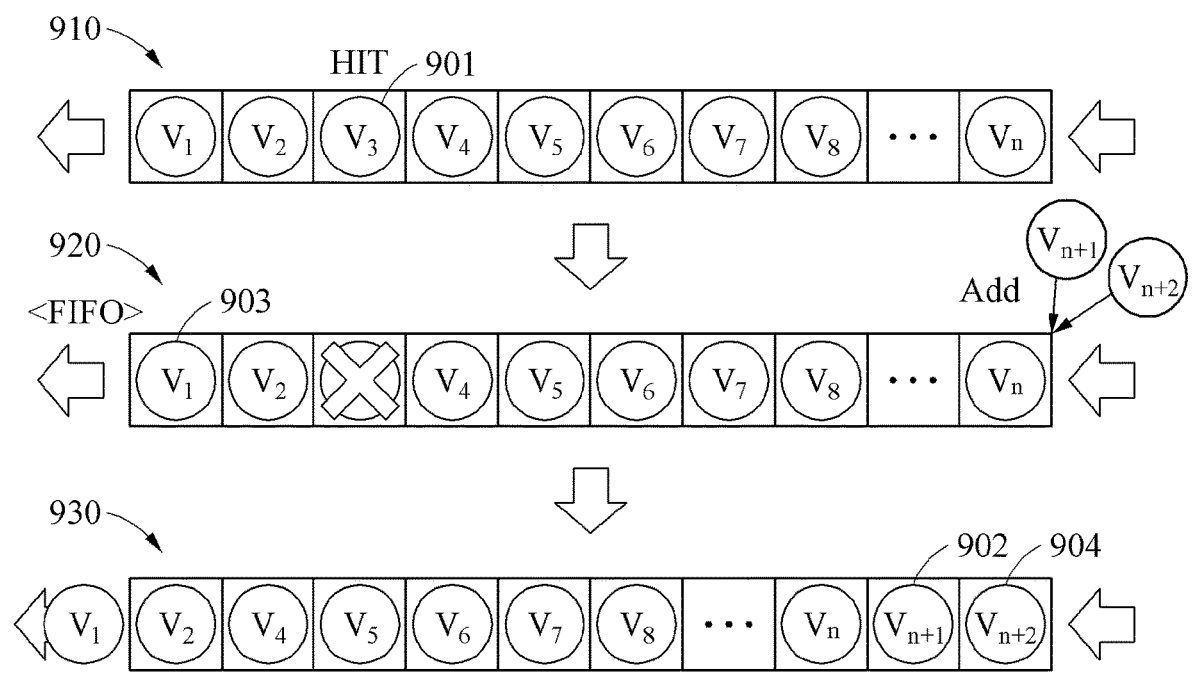
FIG. 9 is a diagram illustrating an example of managing a second cache memory in a multi-level caching system according to an example embodiment.

For example, referring to FIG. 9, when the second cache memory 152, 920 is full after a neighboring vertex $V_{n+1}$ 902 is added to a second cache memory 152, 920, the memory manager 130 may delete a vertex $V_1$ 903 that is stored for a longest period of time in the second cache memory 920, and may add the other neighboring vertex, that is, a vertex $V_{n+2}$ 904 to the second cache memory 920.

As described above, the memory manager 130 may provide the first cache memory 151 and the second cache memory 152 in the multi-level memory hierarchy, to load (cache) data in each cache memory based on different criteria, to manage the first cache memory 151 based on a TTL value and to manage the second cache memory 152 based on the FIFO scheme, and to delete and add data based on different criteria. Thus, it is possible to enhance a graph query processing performance by quickly and accurately searching for data of a subgraph requested in a subsequent graph query request.

Also, since frequently used data among data (vertices) of a subgraph used in a query request is highly likely to be used again in a subsequent graph query request, the multi-level caching system 100 may further include a pattern extractor 140 configured to extract a frequently used query pattern from a subgraph used in a previous query request so that corresponding data may be set to have a relatively high TTL value.

The pattern extractor 140 may identify a list of vertices constituting a subgraph for each previous query recorded in a query history table, and may extract a query pattern including a first vertex having a high frequency of use based on the list from the subgraph.

For example, the pattern extractor 140 may arrange the list in a descending order based on a frequency of use, may call each of the vertices in the list in the order of an arrangement, may generate a frequent pattern (FP)-tree based on an edge indicating a number of accesses between the vertices, and may extract a query pattern based on the FP-tree.

Figure 3:
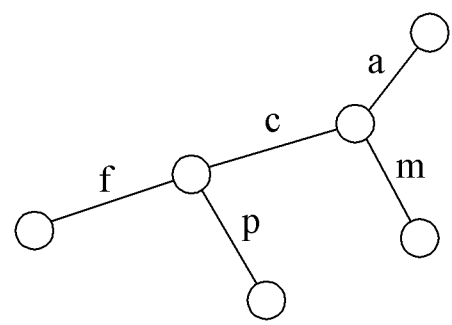
FIG. 3 illustrates examples of a subgraph for a query history in a multi-level caching system according to an example embodiment.
Figure 3:
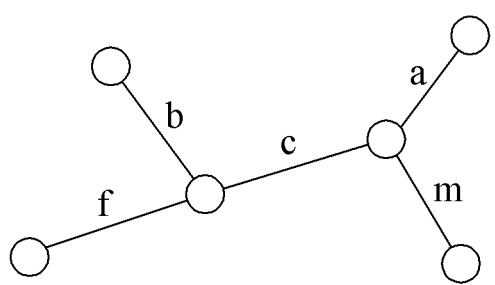
Figure 3:
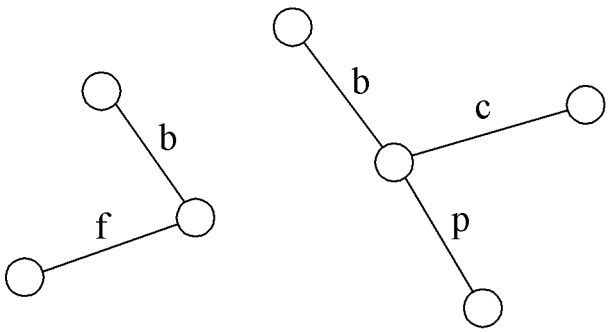
Figure 3:
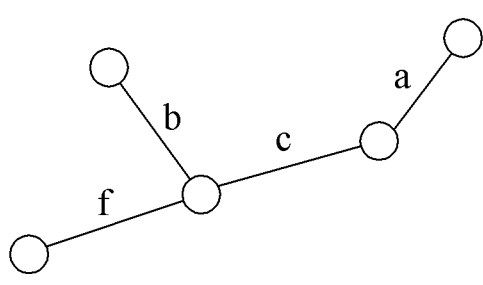
Figure 4:
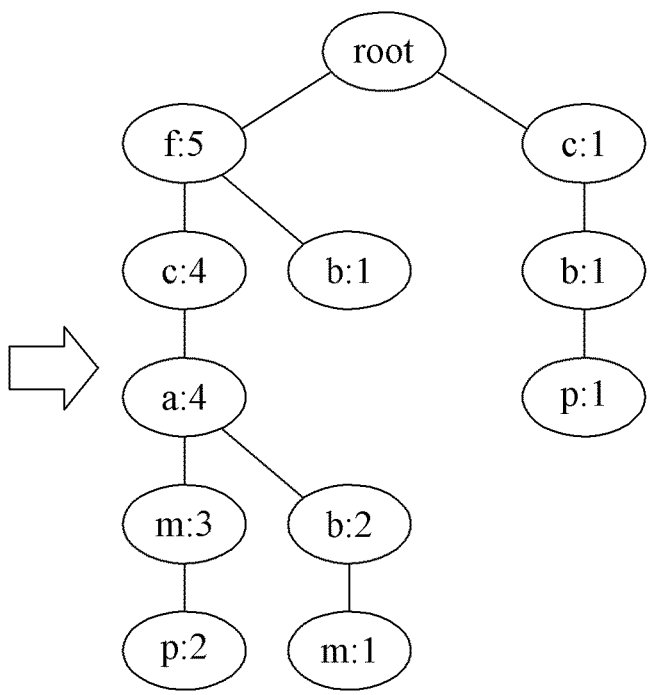
FIG. 4 is a diagram illustrating an example of a query history table and an example of a frequent pattern (FP)-tree in a multi-level caching system according to an example embodiment.

Referring to FIGS. 3 and 4, every time a query of a subgraph is received, the memory manager 130 may record the query in a query history table 410, may manage the query history table in a form of a queue, and may delete a query in an order that queries are received when the query history table 410 is full of queries.

For example, when a query request is received, the memory manager 130 may associate data (vertices) of a subgraph corresponding to each query with a query ID and may record the data in the query history table 410 or record edges 'f', 'c', 'a', 'm' and 'p' of the subgraph corresponding to each query in the query history table 410.

The pattern extractor 140 may generate an FP-tree 420 by analyzing subgraphs of FIG. 3 used in previous queries (queries 1 through 5) recorded in the query history table 410.

The pattern extractor 140 may search for a list of vertices that are frequently generated while searching for the query history table 410, may arrange the list in a descending order, may generate the FP-tree 420 through a recursive call while retrieving a query based on the order, and may assign a pattern weight P using the FP-tree 420.

The pattern extractor 140 may call a used vertex based on a number of accesses stored in an edge of the query history table 410, may generate the FP-tree 420, may extract a query pattern including a first vertex with a high frequency of use in each subgraph used in a previous query recorded in the query history table 410, using the FP-tree 420, and may assign a pattern weight, so that the first vertex in the query pattern may reside in the first cache memory 151 for a longer period of time.

The memory manager 130 may set a TTL value of the first vertex based on a number of first vertices in the query pattern and the pattern weight assigned to the first vertex, and may manage the first cache memory 151 based on the TTL value.

For example, referring to FIG. 5, when a query pattern $P_1$ is extracted, the memory manager 130 may set a TTL value of each of vertices A, B and C included in the query pattern $P_1$ based on a pattern weight P assigned to the vertices A, B and C and a number N of vertices included in the query pattern $P_1$, using Equation 1 shown below. In Equation 1, a constant $\alpha$ may be set to "0.3."

$$TTL = \alpha N \times (1-\alpha) P \quad \text{[Equation 1]}$$

For example, referring to a table of FIG. 6, the memory manager 130 may set a TTL value of each of the vertices A, B and C in the query pattern $P_1$ to "3" that is greater than a TTL value of "2.5" of vertices D and E used in queries Q1, Q2 and Q3 or a TTL value of "2.2" of vertices F, G, H, I and J, based on the pattern weight P, so that the vertices A, B and C may reside in the first cache memory 151 for a longer period of time.

Also, as described above, the memory manager 130 may continue to adjust a TTL value set when data is stored in the first cache memory 151 every time a query is repeated, and may manage caching of data based on the adjusted TTL value so that data with a relatively high availability among data used when a subgraph of a previous query is provided may be managed to be maintained in the first cache memory 151 at all times.

For example, the memory manager 130 may adjust a set TTL value for all data in the first cache memory 151 to be reduced by a predetermined value every time a query is requested, while adjusting a set TTL value of data hit by searching the first cache memory 151 to be increased, so that caching in the first cache memory 151 may be maintained for a longer period of time.

Also, the memory manager 130 may additionally record a query in the query history table in response to a reception of a request for the query, and may update a TTL value of the first vertex further based on a pattern weight for a second vertex constituting a query pattern extracted using the additionally recorded query.

In other words, the memory manager 130 may update a TTL value set for data stored in advance in the first cache memory 221 based on a pattern weight changed based on a newly extracted query pattern using an FP-tree generated by further reflecting the query additionally recorded in the query history table.

When the assigned pattern weight is increased or reduced by newly extracting a query pattern due to the additionally recorded query, the memory manager 130 may update a TTL value of data (the first vertex) included in the newly extracted query pattern among data stored in the first cache memory 151 by reflecting a change in the pattern weight.

As described above, according to an example embodiment, it is possible to predict and separately cache data that is highly likely to be used in a subsequent graph query request based on an access frequency to each subgraph, instead of merely loading data of each subgraph used in a query history into an existing single-layer cache memory.

Also, according to an example embodiment, it is possible to efficiently predict data that is highly likely to be used in a subsequent graph query request, by searching for data of each subgraph used in a query history and neighboring data used together with the data and by caching the data and the neighboring data.

In addition, according to an example embodiment, it is possible to efficiently search multi-level cache memories (for example, "2-layer" cache memories) in a graph query request, possible to enhance a graph processing performance, by separately loading data of a subgraph used in a query history and neighboring data used together with the data in different cache memories, and possible to easily manage data that are highly likely to be used although not used with the data used in the query history.

Furthermore, according to an example embodiment, it is possible to increase a lifespan of data so that data may reside in a first cache memory for a relatively long period of time, by extracting query patterns overlapping in each subgraph used in a previous query request, by assigning a weight to data corresponding to the query patterns and by setting the data to have a time-to-live (TTL) value greater than those of other data.

Moreover, according to an example embodiment, it is possible to prevent data stored in a cache memory from being frequently replaced and prevent data with a relatively low availability from being cached, by caching a subgraph with a relatively high accessibility based on an access frequency and a subgraph usage pattern.

Figure 2:
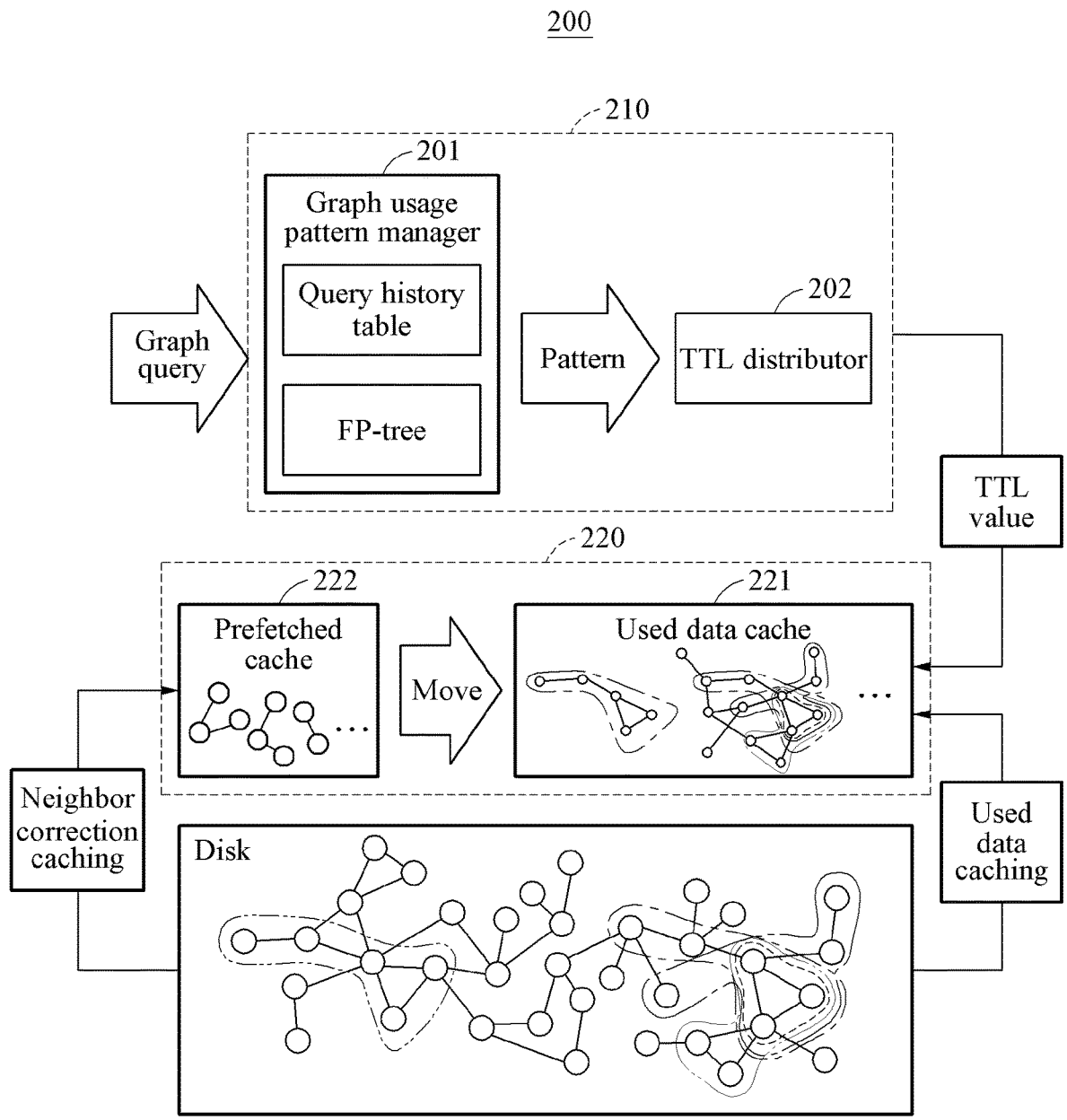
FIG. 2 is a diagram illustrating a multi-level caching system according to an example embodiment.

FIG. 2 is a diagram illustrating a multi-level caching system according to an example embodiment.

Referring to FIG. 2, a multi-level caching system 200 according to an example embodiment may include a cache manager 210, and a 2-level cache memory 220.

The cache manager 210 may predict data with a high availability by analyzing a subgraph used in a query history based on an access frequency and a usage pattern, and may store (cache) the predicted data, data used in the query history, and neighboring data used together with the data although not used separately in different cache memories, to implement the 2-level cache memory 220.

The cache manager 210 may manage the 2-level cache memory 220 using different schemes every time a query request is received, to delete data that is stored for a long period of time and that is not used, or to add new data.

For example, the cache manager 210 may include a graph usage pattern manager 201 and a TTL distributor 202.

The graph usage pattern manager 201 may record a query (hereinafter, referred to as a "previous query") requested from a point in time at which a query request is received in a query history table, may implement an FP-tree based on a frequency of a request for the previous query (that is, a frequency of use of a subgraph), and may detect a frequently used query pattern from the previous query.

For example, the graph usage pattern manager 201 may detect, as a query pattern, a region (for example, $P_1$ of FIG. 5) in which subgraphs used in the previous query overlap.

The TTL distributor 202 may set a TTL value that indicates a time left until caching expires for each data cached in the used data cache 221. The cache manager 210 may manage the data cached in the used data cache 221 based on the set TTL value.

For example, when data of a subgraph used in the previous query is cached in the used data cache 221, the TTL distributor 202 may assign a TTL value to each of the data.

In this example, the TTL distributor 202 may set a TTL value of data in the query pattern to be greater than that of another data based on a pattern weight, so that the data in the query pattern may reside in the used data cache 221 for a longer period of time.

The 2-level cache memory 220 may include the used data cache 221 and a prefetched cache 222.

The used data cache 221 may store (cache) data (vertices) of a subgraph used in a previous query.

In other words, the used data cache 221 may store (cache) data that is highly likely to be used again due to a great TTL value among the data (vertices) of the subgraph used in the previous query.

The prefetched cache 222 may store data that is not used in the previous query, but is highly likely to be used in a subsequent query.

In other words, the prefetched cache 222 may store neighboring data with a highest number of accesses among neighboring data (neighboring vertices) accessible by data (vertices) stored in the used data cache 221.

When a graph query request is received, the cache manager 210 may determine whether graph data associated with the used data cache 221 and the prefetched cache 222 exist.

For example, the cache manager 210 may simultaneously search the used data cache 221 and the prefetched cache 222 for graph data. When graph data is not found in the used data cache 221 by searching the used data cache 221 prior to the prefetched cache 222, the cache manager 210 may search the prefetched cache 222.

In this example, when graph data is not found in both the used data cache 221 and the prefetched cache 222, the cache manager 210 may search for graph data from a disk, for example, an auxiliary memory, such as an HDD and an SSD.

When found graph data is output as a response to the graph query request, the cache manager 210 may cache the graph data in the used data cache 221, and may cache neighboring data of the graph data in the prefetched cache 222.

Also, the cache manager 210 may additionally record the query in the query history table, and may update a TTL value set for data stored in the used data cache 221 based on a pattern weight changed based on a query pattern using an FP-tree generated by reflecting the query additionally recorded in the query history table.

FIG. 3 illustrates examples of a subgraph for a query history in a multi-level caching system according to an example embodiment.

FIG. 3 illustrates examples of a subgraph used in a query (previous query) requested and recorded in a query history table.

A subgraph may include one or more vertices and edges 'a', 'b', 'c', 'f', 'm' and 'p' connecting vertices.

A vertex may store data such as information or a feature, and an edge may store a number of accesses of each of two vertices connected by the edge, that is, a number of times data stored in the two vertices are used together.

For example, an edge f connecting vertices A and B in a subgraph may store a number of times the vertices A and B are used together and a number of times the vertex A accesses the vertex B.

Thus, based on the edge f indicating that a number (a number of times data stored in the vertex A and data stored in the vertex B are sequentially used) of accesses to the vertices A and B in a sequence, it is possible to know a number of accesses or an access history of the vertices A and B in all subgraphs used in a query history including the subgraph.

In subgraphs used in queries 1 to 5 of FIG. 3, an edge f is used four times, an edge c is used four times, an edge a is used three times, an edge p is used twice, an edge m is used twice, and an edge b is used four times. The above frequency of use (the number of accesses) may be stored in each of the edges.

As described above, a multi-level caching system may count a number of times two vertices are used together in each subgraph used in a previous query recorded in a query history table, and a number of times an edge is used, and may store the counted numbers for each edge.

FIG. 4 is a diagram illustrating an example of a query history table and an example of an FP-tree in a multi-level caching system according to an example embodiment.

Referring to FIG. 4, because data (vertices) of a subgraph frequently used in a query request is likely to be used again, when data used in a previous query is stored in a first cache memory, a multi-level caching system according to an example embodiment may assign a pattern weight so that the data may have a greater TTL value.

For example, the multi-level caching system may record a query of a subgraph in a query history table 410 every time a query of a subgraph is received, and may delete a query in an order that queries are received when the query history table 410 is full of queries while managing the query history table 410 in a form of a queue.

The multi-level caching system may search for a list of vertices that are frequently generated while searching for the query history table 410, may arrange the list in a descending order, may generate the FP-tree 420 through a recursive call while retrieving a query based on the order, and may assign a pattern weight P using the FP-tree 420.

FIG. 4 illustrates the query history table 410 in which previous queries (queries 1 to 5) requesting the subgraphs of FIG. 3 are recorded, and the FP-tree 420 generated by analyzing the previous queries.

For example, when a query request is received, the multi-level caching system may associate data (vertices) of a subgraph corresponding to each query with a query ID and may record the data in the query history table 410 or record edges 'f', 'c', 'a', 'm' and 'p' of a subgraph corresponding to each query in the query history table 410. The multi-level caching system may generate the FP-tree 420 by calling a used vertex based on edges of the query history table 410.

The multi-level caching system may extract a query pattern including a first vertex with a high frequency of use from each subgraph used in a previous query recorded in the query history table 410, using the FP-tree 420, and may assign a pattern weight, so that the first vertex in the query pattern may reside in the first cache memory for a longer period of time.

Figure 5:
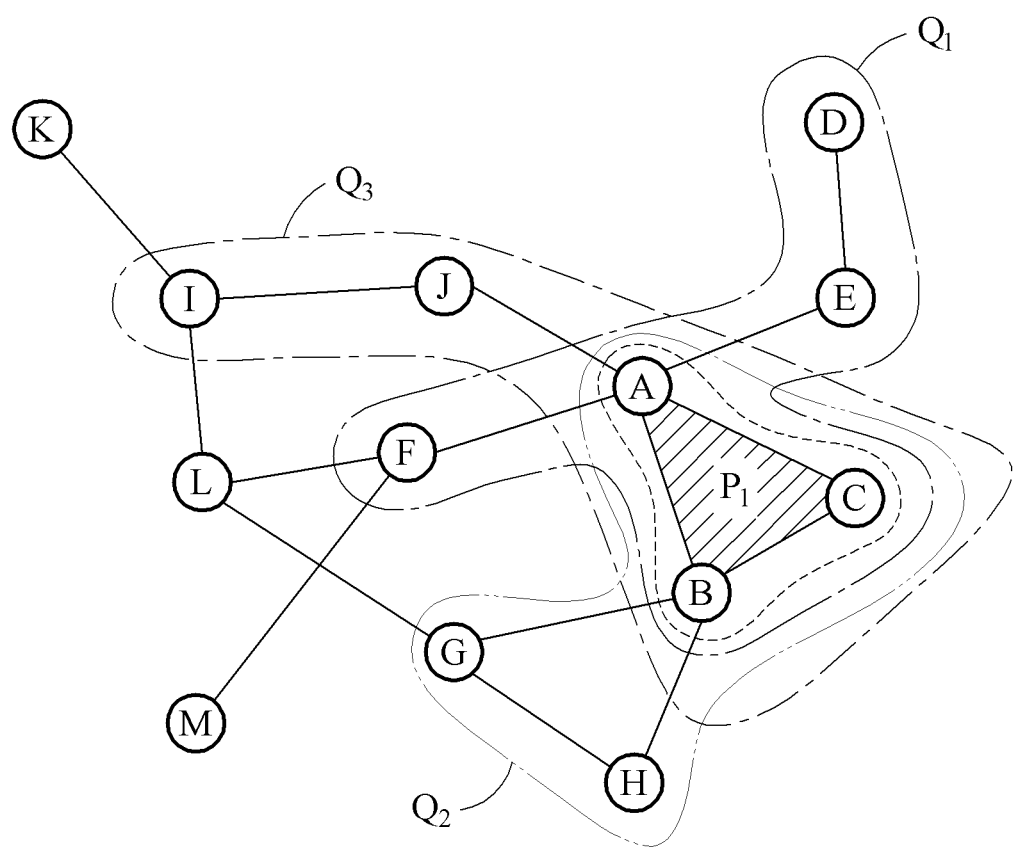
FIG. 5 is a diagram illustrating a process of extracting a query pattern in a multi-level caching system according to an example embodiment.

FIG. 5 is a diagram illustrating a process of extracting a query pattern in a multi-level caching system according to an example embodiment.

Referring to FIG. 5, when queries Q1, Q2 and Q3 are requested, a multi-level caching system according to an example embodiment may store vertices A, B, C, D, E, F, G, H, I and J constituting a subgraph of each query in a first cache memory in which used data is cached among multi-level cache memories.

The multi-level caching system may store vertices K, L and M that are neighboring vertices of used vertices F and I although not used in the queries Q1, Q2 and Q3 in a second cache memory in which neighboring data is cached among the multi-level cache memories.

The multi-level caching system may detect a query pattern $P_1$ used in all of subgraphs used in the queries Q1, Q2 and Q3, using the query history table and the FP-tree, and may assign a pattern weight P to vertices A, B and C included in the detected query pattern $P_1$.

The multi-level caching system may set the vertices A, B and C to which the pattern weight P is assigned to have a TTL value greater than those of vertices D, E, F, G, H, I and J used in the queries Q1, Q2 and Q3.

FIG. 6 is a table illustrating a TTL value set based on an extraction of a query pattern in a multi-level caching system according to an example embodiment.

Referring to FIG. 6, a multi-level caching system according to an example embodiment may set a TTL value for each of vertices while storing vertices A, B, C, D, E, F, G, H, I and J used in queries Q1, Q2 and Q3 in a first cache memory, and may manage each vertex to reside in the first cache memory during a period of time corresponding to the TTL value.

The multi-level caching system may set a greater TTL value to a frequently used vertex among vertices used in the queries Q1, Q2 and Q3 so that the vertex may reside in the first cache memory for a longer period of time.

For example, when the query pattern $P_1$ is extracted based on a query management table and an FP-tree as shown in FIG. 5, the multi-level caching system may set a TTL value of each of the vertices A, B and C included in the query pattern $P_1$ based on the pattern weight P assigned to the vertices A, B and C and a number N of vertices included in the query pattern $P_1$, using Equation 1 described above. In Equation 1, a constant α may be set to "0.3."

The table of FIG. 6 shows a TTL value of each of vertices set based on Equation 1.

As shown in the table, the multi-level caching system may set a TTL value of each of the vertices A, B and C in the query pattern $P_1$ to "3" that is greater than a TTL value of "2.5" of vertices D and E used in queries Q1, Q2 and Q3 or a TTL value of "2.2" of vertices F, G, H, I and J, based on the pattern weight P, so that the vertices A, B and C may reside in the first cache memory for a longer period of time.

The multi-level caching system may set a TTL value of each of neighboring vertices K, L and M that are not used in the queries Q1, Q2 and Q3 to "0."

FIG. 7 is a diagram illustrating a process of caching a neighboring vertex in a multi-level caching system according to an example embodiment.

Referring to FIG. 7, the multi-level caching system may store a number of accesses of two vertices connected via an edge in each edge of graph data.

For example, when vertices A and B are used together in a subgraph output in response to a graph query request, the multi-level caching system may increment a number of accesses of an edge connecting the vertices A and B by "1."

The multi-level caching system may select top "k" (for example, two) neighboring vertices with a relatively high access history based on a number of accesses stored in an edge of graph data, and may cache the selected neighboring vertices in a second cache memory.

The multi-level caching system may select a neighboring vertex with a relatively high access history among neighboring vertices of a single hop, or may select a neighboring vertex with a relatively high access history by searching a chain structure up to neighboring vertices of a multi-hop. In an example of caching of multi-hop neighboring vertices, the multi-level caching system may repeat a process of selecting a neighboring vertex with a relatively high number of accesses from neighboring vertices selected in a previous hop.

The multi-level caching system may cache a vertex used in a graph query request in the first cache memory while caching a neighboring vertex that is connected to the used vertex via an edge within a predetermined number of hops and that has a high availability (high number of accesses) although not used, in the second cache memory.

As shown in FIG. 7, while caching, in the first cache memory, vertices B, C, I, J and N used in the subgraph 710 output in response to a reception of a query request, the multi-level caching system may select the vertices G 721, M 731, L 722 and O 732 that have a relatively high number of accesses among neighboring vertices connected via an edge within two hops to the vertices B, C, I, J and N used in the subgraph 710 although not used in the subgraph 710, and may cache the vertices G 721, M 731, L 722 and O 732 in the second cache memory.

In an example, when a number of hops is within "1," the multi-level caching system may select the vertex G 721 that accessed the vertex B "9" times and vertex M 731 that accessed the vertex N "14" times from vertices A, D, G, H and M that are respectively adjacent to the vertices B, C, I, J and N used in the subgraph 710, and may cache the vertices G 721 and M 731 in the second cache memory. In this example, the number of accesses by each of the vertices G 721 and M 731 may be within top two numbers of accesses. In other words, the multi-level caching system may not cache, in the second cache memory, the other neighboring vertices, that is, the vertices A, D and H with a relatively low number of accesses.

In another example, when a number of hops is within "2," the multi-level caching system may select the vertex L 722 that accessed the vertex G 721 "11" times and the vertex O 732 that accessed the vertex M 731 "17" times from vertices K, L, H and O that are adjacent to the vertices G 721 and M 731, and may cache the vertices L 722 and M O 732 in the second cache memory. In this example, the number of accesses by each of the vertices L 722 and O 732 may be within top two numbers of accesses. Similarly, the multi-level caching system may not cache the other neighboring vertices, that is, the vertices K and H with a relatively low number of accesses in the second cache memory.

FIG. 8 is a diagram illustrating an example of managing a first cache memory in a multi-level caching system according to an example embodiment.

Referring to FIG. 8, when a query requesting the subgraph 801 is received, a multi-level caching system according to an example embodiment may search for three vertices, for example, vertices $V_1$, $V_3$ and $V_{n+1}$ included in the subgraph 801 from a first cache memory 810 in which vertices of a subgraph used in a previous query request are cached.

When two vertices, for example, the vertices $V_1$ and $V_3$ among the three vertices are hit in the first cache memory 810 and when the other vertex, for example, the vertex $V_{n+1}$ fails to be hit, the multi-level caching system may re-search for the vertex $V_{n+1}$ 803 from a second cache memory in which a neighboring vertex that is not used is cached. When the vertex $V_{n+1}$ 803 is hit in the second cache memory, the multi-level caching system may move the vertex $V_{n+1}$ 803 of the used second cache memory to the first cache memory 810 while outputting the subgraph 801 including the vertices $V_1$, $V_3$ and $V_{n+1}$ as a response to the query request.

The multi-level caching system may perform updating to increase TTL values set for the vertices $V_1$ and $V_3$ hit in the first cache memory 810, so that the vertices $V_1$ and $V_3$ may reside in the first cache memory 810 for a longer period of time.

For example, when the first cache memory 810 capable of storing "n" vertices is full, the multi-level caching system may add the new vertex $V_{n+1}$ 803 to the first cache memory 810, instead of deleting a vertex $V_3$ 802 with a TTL value less than a TTL value assigned to the new vertex $V_{n+1}$ 803 from the first cache memory 810, and may update the first cache memory 810 to a first cache memory 820.

In this example, when a vertex with a TTL value less than that of the new vertex $V_{n+1}$ 803 is not present in the first cache memory 810, the multi-level caching system may maintain the new vertex $V_{n+1}$ 803 in the second cache memory instead of adding the new vertex $V_{n+1}$ 803 to the first cache memory 810.

As described above, the multi-level caching system may manage vertices in the first cache memory 810, 820 based on TTL values, may replace a vertex with a minimum TTL value by a new vertex when the first cache memory 810, 820 are full, and may insert the new vertex.

FIG. 9 is a diagram illustrating an example of managing a second cache memory in a multi-level caching system according to an example embodiment.

Referring to FIG. 9, when a query request is received, a multi-level caching system according to an example embodiment may search for a vertex $V_3$ of a query corresponding to the query request from a first cache memory in which a vertex of a subgraph used in a previous query is cached. When the vertex $V_3$ is not found in the first cache memory, the multi-level caching system may re-search for the vertex $V_3$ from a second cache memory 910 in which a neighboring vertex that is not used is cached.

When a vertex $V_3$ 901 is hit in the second cache memory 910, the multi-level caching system may delete the vertex $V_3$ 901 from the second cache memory 910 and may move the vertex $V_3$ 901 to the first cache memory.

Also, the multi-level caching system may select neighboring vertices $V_{n+1}$ 902 and $V_{n+2}$ 904 with numbers of accesses within top two numbers of accesses among neighboring vertices with a history of an access next to the vertex $V_3$ 901 in a query history from a disk memory, and may add the neighboring vertices $V_{n+1}$ 902 and $V_{n+2}$ 904 to the second cache memory 920.

When the second cache memory 920 is full by adding the neighboring vertex $V_{n+1}$ 902 to the second cache memory 920, the multi-level caching system may delete the vertex $V_1$ 903 that is stored in the second cache memory 920 for a longest period of time, may add the neighboring vertex $V_{n+2}$ 904 to the second cache memory 920, and may perform updating to a second cache memory 930.

Hereinafter, a multi-level caching method performed by the multi-level caching system 100 according to an example embodiment will be described in detail with reference to FIG. 10.

Figure 10:
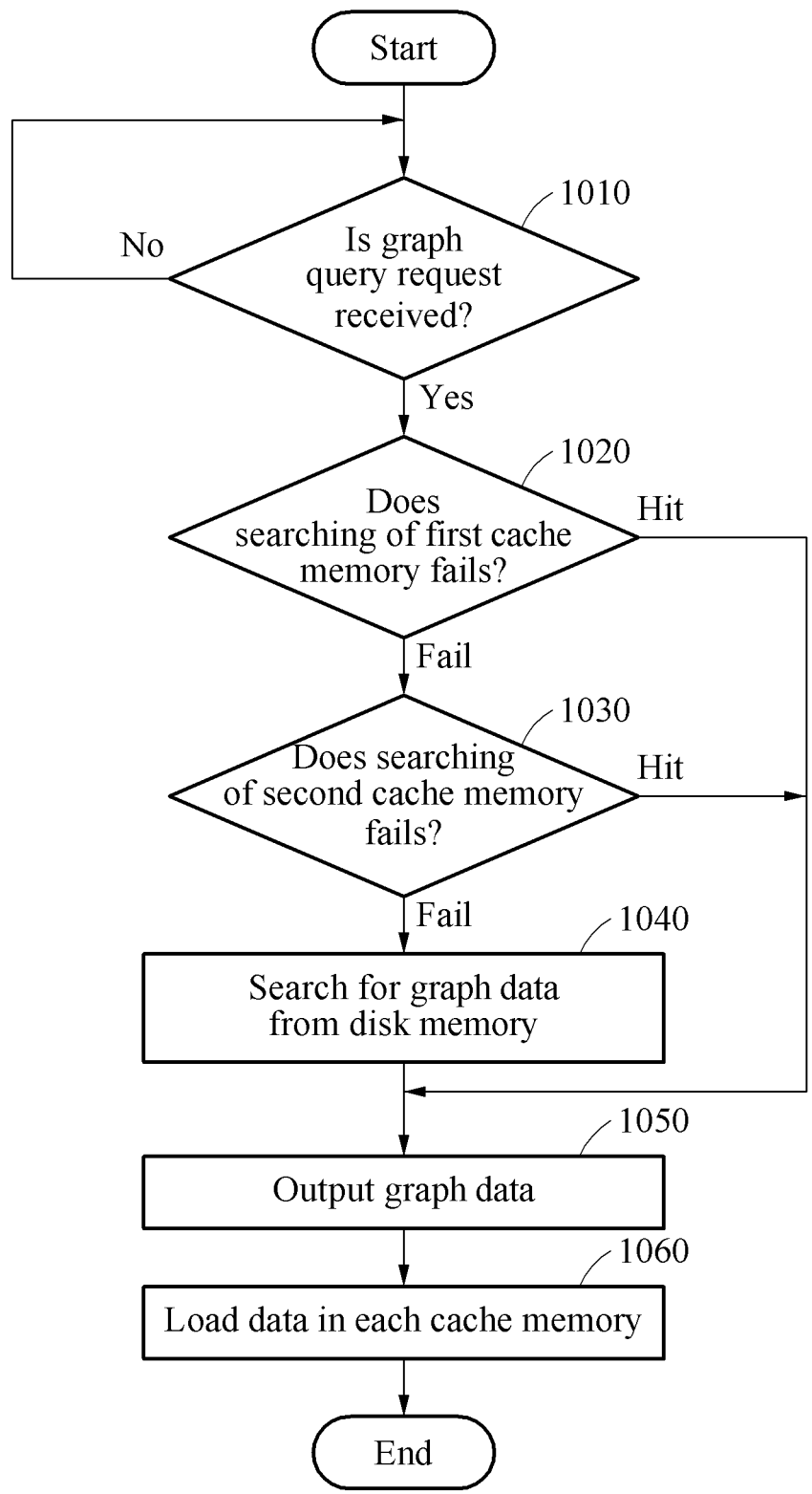
FIG. 10 is a flowchart illustrating a multi-level caching method according to an example embodiment.

FIG. 10 is a flowchart illustrating a multi-level caching method according to an example embodiment.

A multi-level caching method to enhance a graph processing performance according to an example embodiment may be performed by the above-described multi-level caching system 100.

Referring to FIG. 10, in operation 1010, the multi-level caching system 100 determines whether a graph query request is received.

When the graph query request is determined to be received, the multi-level caching system 100 searches for graph data associated with a query corresponding to the graph query request from a first cache memory in which data output in response to a previous query request is stored in operation 1020.

When the graph data is hit in the first cache memory in operation 1020 (cache hit), the multi-level caching system 100 outputs the graph data in operation 1050.

When the searching of the first cache memory fails in operation 1020, the multi-level caching system 100 re-searches for the graph data from a second cache memory in which neighboring data having a history of an access to each of data stored in the first cache memory is stored in operation 1030.

When the graph data is hit in the second cache memory in operation 1030 (cache hit), the multi-level caching system 100 outputs the graph data in operation 1050.

When the searching of the second cache memory fails in operation 1030, the multi-level caching system 100 searches for the graph data from a disk memory in operation 1040.

In operation 1050, the multi-level caching system 100 outputs graph data found in the disk memory.

In operation 1060, the multi-level caching system 100 may load the output graph data and neighboring data associated with the graph data separately in multi-level cache memories.

For example, in operation 1060, the multi-level caching system 100 may store each of vertices included in the output graph data in the first cache memory, and may store a neighboring vertex used together with each of the vertices in the second cache memory.

As described above, the multi-level caching system 100 may enhance enhancing a graph query processing performance using a multi-level caching method of caching frequently accessed graph data and neighboring data of the frequently accessed graph data separately in different cache memories based on an access frequency and a graph usage pattern in a query history.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multi-level caching method comprising:
receiving a query request for graph data;
searching for the graph data within a first cache memory in which data output in response to a previous query request is stored;
re-searching for the graph data within a second cache memory in which neighboring data with prior access to the data stored within the first cache memory is stored when the graph data is not found in the first cache memory;
outputting first neighboring data found by the re-searching for the graph data when a response to the query request is output;
storing the first neighboring data within the first cache memory;
selecting data with prior access to the first neighboring data as new neighboring data;
replacing previously-stored neighboring data with the new neighboring data within the second cache memory;
identifying a list of vertices constituting a subgraph, for each previous query recorded in a query history table;
extracting a query pattern including a first vertex with a high frequency of use from the subgraph based on the list; and
setting a time-to-live (TTL) value of the first vertex based on a number of first vertices in the query pattern and a pattern weight assigned to the first vertex.

2. The multi-level caching method of claim 1, wherein the storing of the first neighboring data comprises, when the first cache memory does not have an available storage space:
comparing a TTL value set for data found in the second cache memory to a minimum TTL value among TTL values set for the data in the first cache memory; and
replacing data with the minimum TTL value in the first cache memory by data of the second cache memory, when the TTL value is greater than the minimum TTL value.

3. The multi-level caching method of claim 1, wherein the new neighboring data is selected from data with prior access to the first neighboring data within a predetermined number of hops, based on a number of accesses.

4. The multi-level caching method of claim 3, wherein the previously-stored neighboring data is deleted from the second cache memory as the new neighboring data is stored within the second cache memory.

5. The multi-level caching method of claim 1, wherein
the graph data comprises a plurality of vertices constituting a subgraph corresponding to the query request, and edges connecting the plurality of vertices, and
the outputting of the first neighboring data comprises, when a portion of the plurality of vertices is found in the first cache memory, combining a portion of the vertices found in the first cache memory and remaining vertices found by the re-searching and outputting the combined vertices as the graph data.

6. The multi-level caching method of claim 1, wherein the extracting of the query pattern comprises:
arranging the list in a descending order based on a frequency of use;
calling each of the vertices in the list in an order of the arranged list and generating a frequent-pattern (FP) tree based on an edge indicating a number of accesses between the vertices; and
extracting the query pattern using the FP tree.

7. The multi-level caching method of claim 1, further comprising:
additionally recording the query in the query history table when the query request is received; and
updating the TTL value of the first vertex, further based on a pattern weight assigned to a second vertex of a query pattern extracted using the additionally recorded query.

8. A multi-level caching system comprising:
a searcher configured to receive a query request for graph data and search for the graph data within a first cache memory in which data output in response to a previous query request is stored, the searcher further configured to re-search for the graph data within a second cache memory in which neighboring data with prior access to the data stored within the first cache memory is stored, when the graph data is not found in the first cache memory; and
an outputter configured to output first neighboring data found by the re-searching for the graph data when a response to the query request is output; and
a memory manager configured to store the first neighboring data within the first cache memory, select data with prior access to the first neighboring data as new neighboring data, and replace previously-stored neighboring data with the new neighboring data within the second cache memory;
a pattern extractor configured to identify a list of vertices constituting a subgraph for each previous query recorded in a query history table, and to extract a query pattern including a first vertex with a high frequency of use from the subgraph based on the list; and
a memory manager configured to set a time-to-live (TTL) value of the first vertex based on a number of first vertices in the query pattern and a pattern weight assigned to the first vertex.

9. The multi-level caching system of claim 8, wherein the previously-stored neighboring data is deleted from the second cache memory as the new neighboring data is stored within the second cache memory.

10. The multi-level caching system of claim 8, wherein the memory manager is configured to additionally record the query in the query history table when the query request is received, and to update the TTL value of the first vertex, further based on a pattern weight assigned to a second vertex of a query pattern extracted using the additionally recorded query.

* * * * *